L. KRAMER.
Bee Hive.
No. 64,675.
Patented May 14, 1867.
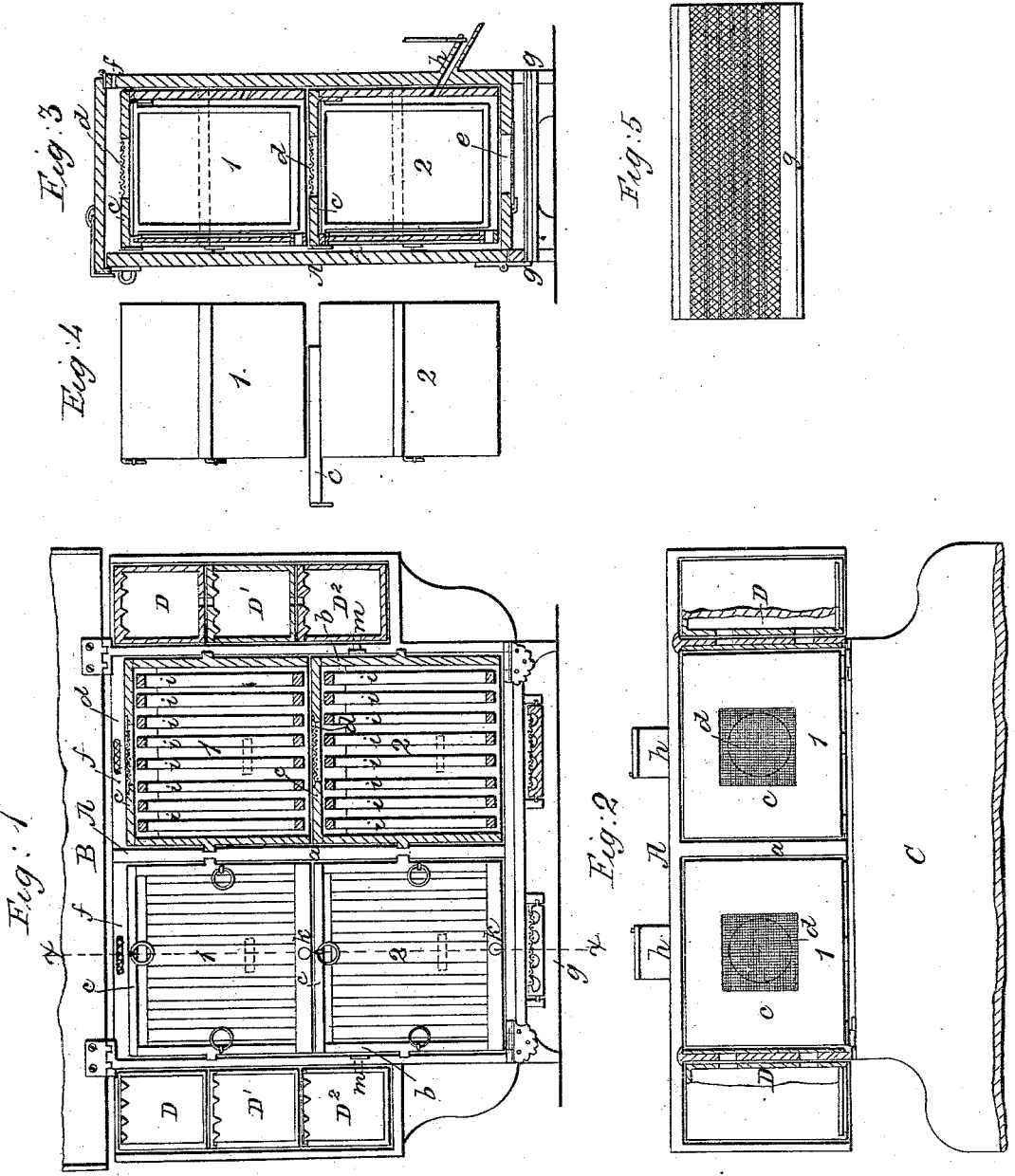

United States Patent Office.

LAFAYETTE KRAMER, OF POINT PLEASANT, PENNSYLVANIA.

*Letters Patent No. 64,675, dated May 14, 1867.*

IMPROVEMENT IN BEE-HIVES.

*The Schedule referred to in these Letters Patent and making part of the same.*

TO ALL WHOM IT MAY CONCERN:

Be it known that I, LAFAYETTE KRAMER, of Point Pleasant, in the county of Bucks, and State of Pennsylvania, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 represents one side of a double hive of my invention, the door being removed.

Figure 2 is a top view of the same with the cover of the case removed.

Figure 3 is a vertical section taken in the plane of the line $x\,x$, fig. 1

Figure 4 is a detached view of the bee-boxes.

Figure 5 is a detached view of the moth-trap.

Similar letters of reference indicate like parts.

This invention relates to improvements in the construction of bee-hives, and consists in the arrangement of movable boxes fitted in a case for double or single hives, and so connected that a swarm of bees can be driven from one box into another box which is empty, whenever the cells in the old honey-comb become clogged with wax, causing the bees to degenerate in size and activity, and it is necessary to restore the swarm by building new comb; also in a convenient provision for colonizing or forming new swarms; also in plans for thorough ventilation of the hive, and for a moth-trap which effectually excludes the bee-moth from the hive and provides for the destruction of the worms. My improved double bee-hive is formed of four separate movable boxes, of about a cubic foot each, arranged in pairs, separated by a partition, in an enclosing case. Each pair of boxes is designed for one swarm of bees, and single bee-hives may be made on the same plan, with one pair of boxes. The upper box of each pair rests immediately on the top of the lower one. The bees occupy the lower box and the upper one is kept empty.

In the drawings, the upper boxes are numbered 1 and the lower boxes 2, in the case A, each pair being separated by a vertical partition, $a$. The top of the case is a hinged lid, B, and the back side is a hinged flap or door, C. At each end of the case are three surplus honey-boxes, $D\,D^1\,D^2$, connected with each hive by holes $m\,m$ leading from the lower boxes 2 2, which are provided with slides $b\,b$ to exclude or admit the bees as desired. The boxes are all supplied with glass fronts on the side next the door, C, and they all have movable tops which are screwed on or otherwise secured so as to be easily taken off. In the tops $c\,c$ of the boxes 1 2, are ventilator opening $d\,d$, covered with wire gauze or other gratings, as shown in fig. 2. In the bottom of the case A are similar gratings, $e\,e$, fig. 3, and in the front side of the hive are also similar gratings, $f\,f$, near the top, and leading from the space above the boxes 1 2 under the lid B, as shown in fig. 1, all of which gratings constitute a system of thorough ventilation through the hive. The gratings $e\,e$ in the bottom of the case are made coarse enough for the bees to cast their excrement through them, to fall upon moth-traps $g\,g$ placed underneath. These moth-traps are small sliding trays running across the case and open at both ends. They are covered with wire gauze, which also slides in and out of the trap. The passages $h\,h$ for the bees into the hive are in the front side of the case above the moth-trap. The moths are attracted by the odor of the bee dirt in the traps $g\,g$, and will enter them instead of the bee-passages $h\,h$, and lay their eggs through the meshes of the wire gauze, so that the worms may be easily destroyed by sliding the trays out occasionally. The hive is thus effectually guarded against the depredations of the moth. The bee-entrances $h\,h$ are provided with doors which may be closed to exclude the drones when it is desired to destroy them at the end of the breeding season, while space is left for the free passage of the working bees. In the boxes 1 2 are movable comb-frames, $i\,i$, which are suspended at equal distances apart, so that they can be easily lifted out of the boxes separately with the honey-comb attached when desired. The bees occupy and breed only in the lower boxes 2 2, which ordinarily have no communication with the upper boxes 1 1, except for ventilation, but when it is desired to remove the old comb and make the bees build new comb for the purpose of renovating the swarm, the top $c$ of a lower box is unscrewed and partly drawn out, as shown in fig. 4. The bees are then driven into the upper empty box by means of tobacco fumes introduced through a hole, $k$, in the bottom of the box, and after the bees are in the upper box it is shifted to the place of the lower one. The bees will then go to work and build new comb in the empty box. And if it be desired to form a new swarm. the bees may be colonized by removing the top $c$ of the box and taking out one of the comb-frames *i i* which has a queen cell in it and transferring it to an empty box in another hive, with as many other comb-frames and bees attached as may be required to form the nucleus of a new swarm, which the bees will form immediately by feeding and developing a queen.

Having thus described my invention, what I claim as new, and desire to secure by Letters Patent, is—

In a double bee-hive, the combination and arrangement of the case A with the hinged lid B, and the hinged door C, enclosing the shifting boxes 1 2, in pairs separated by the partition *a*, and connected with the surplus honey-boxes D D$^1$ D$^2$, substantially as and for the purposes herein described.

The above specification of my invention signed by me this 3d day of October, 1866.

LAFAYETTE KRAMER.

Witnesses:
WM. F. McNAMARA,
ALEX. F. ROBERTS.